(12) United States Patent
Priest (10) Patent No.: US 10,552,859 B2
(45) Date of Patent: Feb. 4, 2020

(54) SYSTEMS, METHODS, AND APPARATUSES FOR TENDER STEERING

(71) Applicant: Obsidian Network, Inc., Durango, CO (US)

(72) Inventor: Travis Priest, Durango, CO (US)

(73) Assignee: Obsidian Networks, Inc., Durango, OR (US)

( * ) Notice: Subject to any disclaimer, the term of this patent is extended or adjusted under 35 U.S.C. 154(b) by 728 days.

(21) Appl. No.: 15/148,595

(22) Filed: May 6, 2016

(65) Prior Publication Data

US 2016/0328704 A1    Nov. 10, 2016

Related U.S. Application Data

(60) Provisional application No. 62/157,560, filed on May 6, 2015.

(51) Int. Cl.
| | |
|---|---|
| G06Q 30/02 | (2012.01) |
| G06Q 20/20 | (2012.01) |
| G06Q 20/34 | (2012.01) |
| G06Q 20/36 | (2012.01) |

(52) U.S. Cl.
CPC ....... *G06Q 30/0226* (2013.01); *G06Q 20/204* (2013.01); *G06Q 20/34* (2013.01); *G06Q 20/363* (2013.01)

(58) Field of Classification Search
USPC ............... 235/383, 375, 487; 705/38–40, 76
See application file for complete search history.

(56) References Cited

U.S. PATENT DOCUMENTS

| | | |
|---|---|---|
| 5,721,768 A | 2/1998 | Stimson et al. |
| 5,903,633 A | 5/1999 | Lorsch |
| 6,032,136 A | 2/2000 | Brake, Jr. et al. |
| 6,405,182 B1 | 6/2002 | Cuervo |
| 6,612,487 B2 | 9/2003 | Tidball et al. |
| 7,174,314 B2 | 2/2007 | Phillips et al. |
| 7,252,226 B2 | 8/2007 | Risafi et al. |
| 7,613,628 B2 | 11/2009 | Ariff et al. |
| 8,126,806 B1 | 2/2012 | Dimartino et al. |
| 8,700,525 B1 | 4/2014 | Rafferty et al. |
| 8,712,854 B1 | 4/2014 | Rafferty et al. |
| 8,943,574 B2 | 1/2015 | Bailey et al. |
| 9,785,938 B2 | 10/2017 | Bailey et al. |

(Continued)

FOREIGN PATENT DOCUMENTS

| | | |
|---|---|---|
| WO | 1999003057 A1 | 1/1999 |
| WO | 2000042581 A1 | 7/2000 |

*Primary Examiner* — Edwyn Labaze
(74) *Attorney, Agent, or Firm* — Morris, Manning & Martin, LLP; Daniel E. Sineway, Esq.; Adam J. Thompson, Esq.

(57) ABSTRACT

A system and methods for the registration of new payment tool processing, reward program identification and other customer registration at the Point-of-Sale (POS), based on electronically linking consumers existing accounts for the purposes of payment, rewards, loyalty, marketing, discounts and or identification of a consumer. The new payment system or rewards program may be delivered through a new card, a mobile program, a wearable product, or any other potential device for collecting communicating or transmitting information used for the aforementioned purposes including running a new program.

25 Claims, 3 Drawing Sheets

INITIAL TRANSACTION AT POINT-OF-SALE (POS)

(56) References Cited

U.S. PATENT DOCUMENTS

| | | |
|---|---|---|
| 9,922,371 B1 | 3/2018 | Bailey |
| 9,965,749 B2 | 5/2018 | Rafferty et al. |
| 10,068,229 B2 | 9/2018 | Bailey et al. |
| 10,078,833 B2 | 9/2018 | Rafferty et al. |
| 10,096,020 B2 | 10/2018 | Bailey et al. |
| 10,438,283 B2 | 10/2019 | Bailey |
| 2002/0138418 A1* | 9/2002 | Zarin ............... G06Q 20/10 705/38 |
| 2002/0161701 A1 | 10/2002 | Warmack |
| 2003/0019770 A1 | 1/2003 | Hodes et al. |
| 2003/0061162 A1 | 3/2003 | Matthews |
| 2003/0126017 A1 | 7/2003 | Rau et al. |
| 2004/0167821 A1 | 8/2004 | Baumgartner |
| 2005/0027655 A1 | 2/2005 | Sharma et al. |
| 2005/0222949 A1 | 10/2005 | Inotay et al. |
| 2006/0074765 A1 | 4/2006 | Crawford et al. |
| 2006/0085231 A1 | 4/2006 | Brofman |
| 2006/0105742 A1 | 5/2006 | Kim et al. |
| 2007/0011089 A1 | 1/2007 | Deschryver |
| 2007/0034688 A1 | 2/2007 | Burke |
| 2007/0045401 A1 | 3/2007 | Strum |
| 2007/0051797 A1 | 3/2007 | Randolph-Wall et al. |
| 2007/0084913 A1 | 4/2007 | Weston |
| 2007/0162337 A1 | 7/2007 | Hawkins et al. |
| 2008/0249928 A1* | 10/2008 | Hill ............... G06Q 20/04 705/39 |
| 2012/0078735 A1 | 3/2012 | Bauer et al. |
| 2012/0130853 A1* | 5/2012 | Petri ............... G06Q 30/0609 705/26.35 |
| 2012/0185321 A1 | 7/2012 | Lal |
| 2012/0304273 A1 | 11/2012 | Bailey et al. |
| 2013/0138519 A1 | 5/2013 | McKenzie et al. |
| 2014/0188712 A1 | 7/2014 | Rafferty et al. |
| 2014/0207593 A1 | 7/2014 | Rafferty et al. |
| 2014/0207683 A1 | 7/2014 | Bailey et al. |
| 2014/0279459 A1* | 9/2014 | Weiss ............... G06Q 20/102 705/40 |
| 2015/0088759 A1 | 3/2015 | Bailey et al. |
| 2015/0142673 A1* | 5/2015 | Nelsen ............... G06Q 20/385 705/76 |
| 2017/0178130 A1* | 6/2017 | Coburn ............... G06Q 20/405 |
| 2017/0372307 A1 | 12/2017 | Bailey et al. |
| 2018/0165761 A1 | 6/2018 | Bailey |
| 2018/0225637 A1 | 8/2018 | Rafferty et al. |
| 2018/0341943 A1 | 11/2018 | Rafferty et al. |
| 2018/0349897 A1 | 12/2018 | Bailey et al. |
| 2019/0012659 A1 | 1/2019 | Bailey et al. |

* cited by examiner

FIG. 1: *INITIAL TRANSACTION AT POINT-OF-SALE (POS)*

FIG. 2. DETAILED TENDER STEERING PROCESS MAP

FIG. 3: *DECISION AND NOTIFICATION PROCESS FOR FINAL REGISTRATION OF NEW PAYMENT METHOD*

SYSTEMS, METHODS, AND APPARATUSES FOR TENDER STEERING

CLAIM OF PRIORITY AND CROSS-REFERENCE TO RELATED APPLICATION

This application claims the benefit of and priority to U.S. Provisional Patent Application No. 62/157,560, filed May 6, 2015, entitled "SYSTEM AND METHOD FOR TENDER STEERING," incorporated herein by reference in its entirety.

TECHNICAL FIELD

The present systems, methods, and apparatuses relate to the activation and registration of a new payment instrument (e.g., card or other payment device), rewards identification and other customer payment instrument registration at a Point-of-Sale (POS) terminal, based on electronically linking the new payment instrument to a preexisting consumer account(s).

BACKGROUND

The majority of merchants today don't engage in "tender steering," or providing incentives to customers to use a particular type of payment method or card. Though many merchants are interested and motivated to get their customers to switch to a specific payment method, the process of getting a customer to register a new payment card or loyalty program at the POS is often difficult, slow, and even impossible if customers do not have all the necessary information with them at the time of sale. Registration rates are very low for tender steering because of the cumbersome nature of the registration process.

Accordingly, there is a long-felt but unresolved need for a method of tender steering that removes the friction generated by traditional registration processes.

BRIEF SUMMARY OF THE DISCLOSURE

Briefly described, and according to one embodiment, aspects of the present disclosure generally relate to systems, methods, and apparatuses for activating new payment and rewards tools, by utilizing customers' preexisting favored payment/rewards programs, such as a Visa® or MasterCard® payment card. By initially pairing the new system and a piece of customer contact information with customers' existing cards and programs, customers may begin using new payment methods to immediately benefit from the new payment and loyalty incentives immediately after the initial activation transaction. After a predetermined threshold such as a period of time or specific number of transactions, customers are notified that to continue using the new system and to receive benefits of the new program, they must complete program registration or conversion via a website or online instrument. This process eliminates the need for customers to go through the tedious and inconvenient process of completely registering for a new payment/rewards tool at the initial POS terminal while letting them immediately begin to enjoy the benefits of the alternative payment method or loyalty program. In one embodiment, such benefits can be conditioned upon later successful conversion.

In one embodiment, a system, comprising a database comprising data corresponding to one or more new payment methods and customer preexisting payment methods; a computer server electronically coupled to said database programmed to receive a request from a point-of-sale terminal at a merchant location to authorize a transaction, the request including data corresponding to a particular new payment method to be issued to a particular customer; receive data corresponding to a particular customer preexisting payment method associated with the particular customer from the point-of-sale terminal; generate and store in said database a link between said particular new payment method and said particular customer preexisting payment method, said link enabling future payment transactions with the particular new payment method to be satisfied via the particular customer preexisting payment method; and transmit a request to authorize said transaction, said request including said data corresponding to the particular customer preexisting payment method based on the link.

In one embodiment, a system, comprising a database comprising data corresponding to one or more activated payment methods, including, for each activated payment method, at least an identification number and a threshold tracking value; data corresponding to one or more customer preexisting payment methods, each of said customer preexisting payment methods associated in the database with at least one of said activated payment methods; a computer server electronically coupled to said database programmed to receive a request from a point-of-sale terminal at a merchant location to authorize a transaction, the request including an identification number for an activated payment method; transmit to said point-of-sale terminal a message indicating denial of the request upon determination that a threshold tracking value for said activated payment method exceeds a pre-determined threshold.

In one embodiment, a point-of-sale terminal for linking a new payment method to a customer preexisting account comprising an alphanumeric keypad; an electronic payment reader; a communications system; a computer processor, electronically connected to said alphanumeric keypad, said electronic payment reader, and said communication system, programmed to receive, from said electronic payment reader, new payment method identification data for an intended product purchase; transmit said payment method identification data via said communications system; receive, via said communications system, a message requesting initiation of an instant activation process; receive customer preexisting account data from said electronic payment reader; receive customer contact data from said alphanumeric keypad; transmit said customer preexisting account data and said customer contact data; and receive authorization for said product purchase in less time than it would typically take for an individual to enter personal information sufficient to open a new financial account.

In one embodiment, a system comprising a database comprising data corresponding to one or more new payment methods, including, for each new payment method, at least an identification number; data corresponding to one or more customer preexisting payment methods; data corresponding to one or more activated payment methods, including, for each payment method, at least an identification number, a link to data corresponding to one of said customer preexisting payment methods, customer contact data, and a threshold tracking value; a computer server electronically coupled to said database programmed to receive a request from a point-of-sale terminal at a merchant location to authorize a transaction, the request including a payment method identification number; matching said payment method identification number with an identification number corresponding to a particular new payment method in said database; transmit a request to the point-of-sale terminal to initiate an instant activation process; receive customer preexisting payment method data from the point-of-sale terminal; receive customer contact data from the point-of-sale terminal; store customer preexisting payment method data in said database; store said identification number corresponding to a particular new payment method in said database as data corresponding to an activated payment method along with a link to said customer preexisting payment method data, said customer contact data, and a threshold tracking value; transmit a request to authorize said transaction, said request including said customer preexisting payment method data; receive a response to said request to authorize said transaction indicating an approval; and transmit a message to said point-of-sale terminal indicating approval.

According to various aspects of the present disclosure, the system, wherein said data corresponding to a particular customer preexisting payment method is converted to a token. Further, the system, wherein said data corresponding to one or more new payment methods includes at least an identification number. Further, the system, wherein said data corresponding to a particular customer preexisting payment method includes data from the magnetic stripe of a credit card. Further, the system, wherein said data corresponding to a particular customer preexisting payment method includes data from the magnetic stripe of a debit card. Further, the system, wherein said system does not perform a credit check on the customer. Further, the system, wherein said computer server is further programmed to deny a future payment transaction with the particular new payment method upon determination that a threshold tracking value for said particular new payment method exceeds a pre-determined threshold. Further, wherein said threshold tracking value indicates the period of time since the particular new payment method was activated. Further, the system, wherein said threshold tracking value indicates the number of transactions since the particular new payment method was activated. Further, the system, wherein said threshold tracking value indicates the total spend since the particular new payment method was activated.

According to various aspects of the present disclosure, the system, wherein said data corresponding to a customer preexisting payment method is converted to a token. Further, the system, wherein said threshold tracking value indicates the period of time since the activated payment method was activated. Further, the system, wherein said threshold tracking value indicates the number of transactions since the activated payment method was activated. Further, the system, wherein said threshold tracking value indicates the total spend since the activated payment method was activated.

According to various aspects of the present disclosure, the system, wherein said customer preexisting account data is read from the magnetic stripe of a credit card. Further, the system, wherein said customer preexisting account data is read from the magnetic stripe of a debit card. Further, the system wherein said computer processor does not receive a social security number.

According to various aspects of the present disclosure, the system, wherein said customer preexisting payment method data is converted to a token. Further, the system, wherein said customer preexisting payment method data includes a credit card account. Further, the system, wherein customer preexisting payment method data includes a bank account. Further, the system, wherein said system does not perform a credit check on the customer. Further, the system, wherein said computer server is further programmed to deny a future payment transaction with the particular new payment method upon determination that a threshold tracking value for said particular new payment method exceeds a pre-determined threshold.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems, methods, and apparatuses for the registration of new payment tools, reward program identification, and other customer registration at a Point-of-Sale (POS), based on consumer's existing accounts, for the purposes of payment, rewards, loyalty, marketing, discounts and or identification of a consumer. The new payment system or rewards program may be delivered through a new card, a mobile program, a wearable product, or any other potential device for collecting, communicating, or transmitting information used for the aforementioned purposes.

When consumers pay for a product or service at a retail location, many merchants are interested in promoting new payment instruments, rewards, marketing or loyalty programs to replace the consumers' existing preferred systems. Traditionally, merchants will ask the customer to activate the new card or program through a paper or electronic form before completing the transaction at the POS.

The following is an illustrative example of how conventional tender steering may be performed at a generic retailer. Any time a customer approaches the POS to complete a transaction, an employee attempts to steer the customer to use or register for the retailer's payment and loyalty card by offering cash back or rewards points for the given purchase. If a customer expresses interest in switching to the retailer's card, the employee then directs the customer to either apply for credit or link his/her bank account to the new retailer card. As part of the registration process, the customer now has to track down a checkbook, or other information not typically carried with them on a daily basis, while still standing at the POS terminal. The result is a frustrated customer, a long line of other impatient customers waiting to make purchases at the POS terminal, and many times, the loss of a potential tender steering opportunity due to a slow, difficult, and inconvenient registration process.

The present disclosure for tender steering and data collection reduces the friction generated by traditional registration processes by allowing consumers to electronically attach the new/offered program to their existing accounts, and have instant physical access to the new program. In one embodiment, the POS at the merchant location collects at least one piece of contact information from the customer in addition to a preexisting card processing tool (e.g., an existing credit or debit card), which provides authorization for that and future transactions to be processed by the consumer's preexisting program. The new program is paired with the customer's existing card or program, and subsequently serves as a funding source when used for future transactions.

In various embodiments, the POS is a traditional point-of-sale terminal that may include a physical or virtual alphanumeric keypad for the customer to enter information. In one embodiment, the POS includes an electronic payment reader that may include various mechanisms for reading payment account information, for example a magnetic swipe reader or a wireless reader to read wireless payment data, such as Apple Pay. In one embodiment, the POS includes a communication system to transmit and receive financial transaction data.

Figure 1:
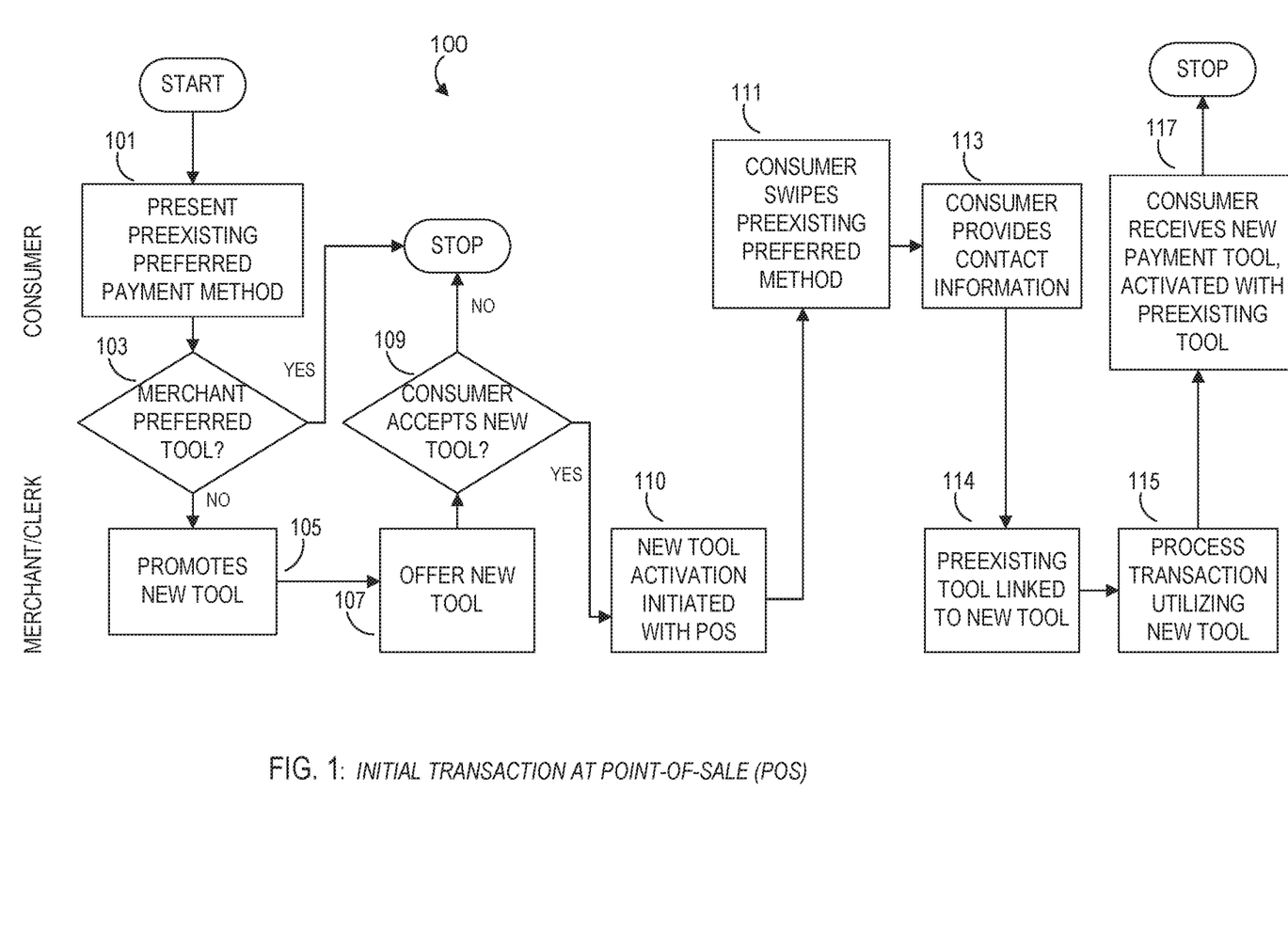
FIG. 1 is a flowchart illustrating an initial registration and transaction process for a new payments/rewards system at a POS, according to one embodiment of the present disclosure.

Now referring to the drawings, FIG. 1 shows an initial registration and transaction process 100 for activating a new payment method according to various embodiments. At the top of FIG. 1 are steps that are usually performed by a consumer. At the bottom of FIG. 1 are steps that are usually performed by a merchant, or clerk, or by a remote system on behalf of the merchant. At step 101, a customer enters a merchant establishment, and approaches the POS terminal to complete a transaction using his/her preferred payment method (also called a payment tool or payment system). At step 103, if the customer's preferred payment method is a merchant preferred method or tool, then the merchant may not offer a new tool. If not, then at step 105, the merchant may offer a new tool or method. The merchant may promote the new tool or method in various ways, for example by orally promoting the new tool or method to the customer, or providing an electronic promotion visible to the customer on the POS. At step 107, the customer is offered a new payment option in the form of a "dead" payment card, meaning that it has not yet been activated. At step 109, if the consumer accepts the new payment method, then at step 110 the operator initiates activation on the POS, and swipes the new "dead" payment system into the POS to register the new card identification number (also called the instant activation process). At step 111, the customer then swipes his/her existing, preferred payment method (for example a Visa or Mastercard credit card). At step 113, the customer provides contact information, such as a mobile phone number, email address, zip code, or other contact data. In one embodiment the contact information does not include full contact information, such as street address. In one embodiment the customer transmits contact information to the POS wirelessly through a smartphone or other portable device, such as a smartwatch. The customer may enter additional information, such as a card verification code for the existing preferred payment. In one embodiment the customer does not provide any personally identifying financial information, such as a social security number.

In one embodiment, the new payment method and the customer's existing, preferred payment method information are sent to an authorization processor. At step 114, the authorization processor recognizes the "dead" payment card from a database of all such cards that have been issued by the retailer. The authorization processor may link the new payment method to information on the customer's existing preferred payment method in a database, thus activating the card. In various embodiments, the link may be an association in a relational database, or any notation in the same cell, line, row, column, or table as data representing the new payment method that indicates an association with the existing preferred payment method. The term database should be understood broadly to refer to any collection of data. At step 115, the authorization processor may then transmit the request to the customer's original payment method organization for authorization, and then transmit an approval or denial of the transaction request back to the merchant point-of-sale terminal. In one embodiment, where the original payment method is a credit or debit card, the authorization processor may use a conventional e-commerce gateway to obtain the authorization. In various embodiments the authorization processor may be the merchant's bank or independent financial services company. At step 117, the customer's transaction is completed, and he/she may take the new payment method. In some embodiments there is no credit check on the customer.

In various embodiments, as the new payment card or rewards program is activated immediately after the initial transaction at the POS, customers instantaneously have access to the benefits of the new program for future transactions. In one embodiment, the terms "immediately" and "instantaneously" refer to a period less than it would typically take for an individual to handwrite or type detailed personal information sufficient to open a new financial account, such as complete contact information, social security number, etc. In one embodiment the terms "immediately" and "instantaneously" mean approximately the time it takes to complete a transaction using a point-of-sale terminal.

In one embodiment, the customer's existing, preferred payment method is tokenized using conventional methods known to those in the art, and the token is stored in a database. In one embodiment, the present disclosure may utilize a new POS terminal separate from the POS terminal used by an establishment, or additional programming to the establishment's existing POS terminal.

Figure 2:
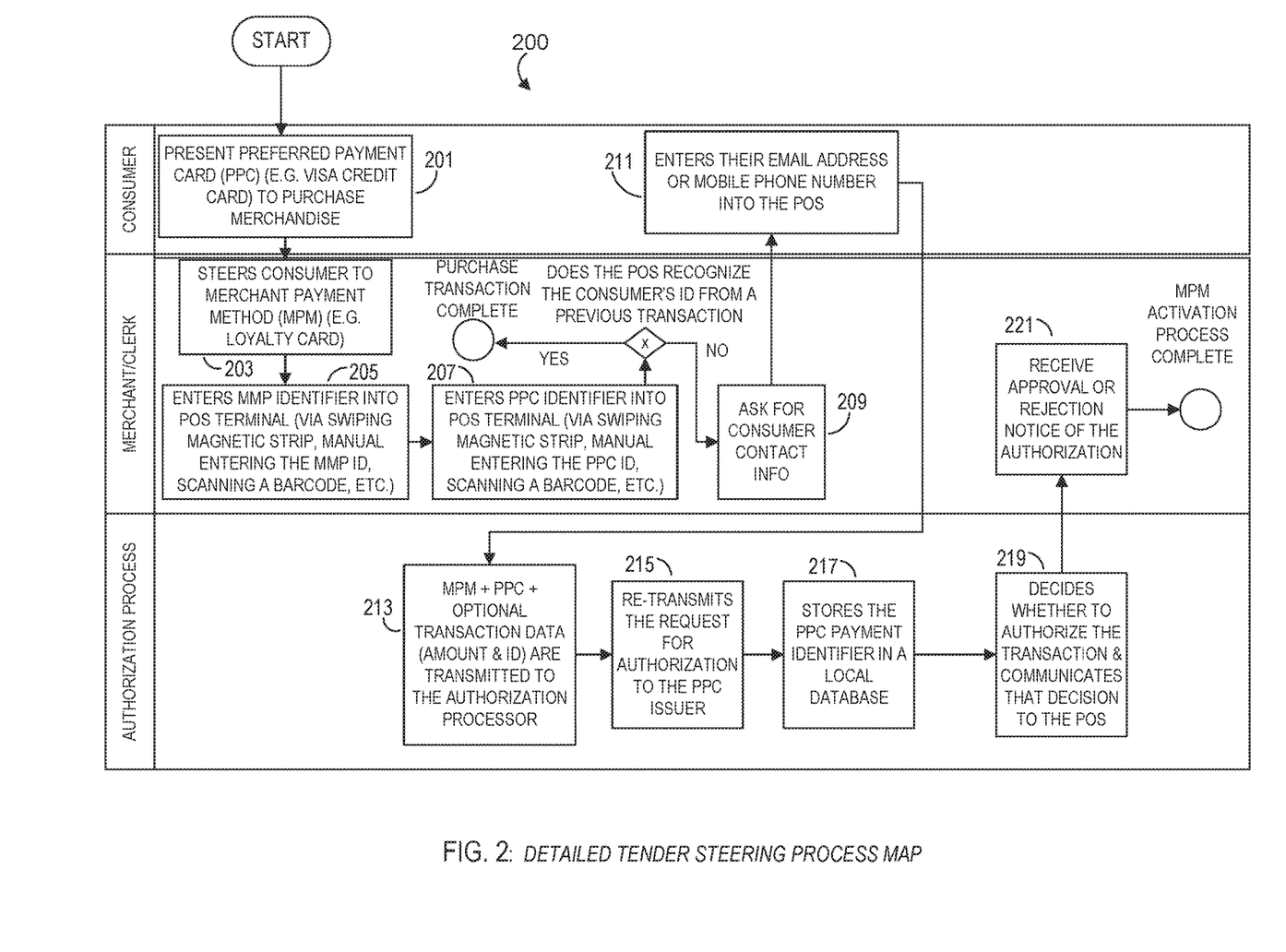
FIG. 2 is a flowchart illustrating a detailed tender steering process, according to one embodiment of the present disclosure.

FIG. 2 is an alternative embodiment of the present disclosure with additional details, that shows a tender steering process 200 for activating a new payment method. At the top of FIG. 2 are steps that are usually performed by a consumer. In the middle are steps that are usually performed by a merchant or clerk, or by a remote system on behalf of the merchant. At the bottom are steps that are usually performed as part of an authorization process. At step 201, a customer may present his or her preferred payment card (PPC) to a merchant to purchase merchandise. At step 203, the merchant steers the customer to a preferred merchant payment method (MPM), for example a merchant credit card or loyalty card. In various embodiments, the merchant may steer the customer by orally suggesting a preferred merchant payment method, or by providing an electronic promotion visible to the customer on the POS. At step 205, the merchant (or customer) enters identifier information for the MPM into a POS terminal, for example by swiping a magnetic strip on the MPM card, engaging an embedded chip with the POS, manually entering identifying information, wirelessly engaging an MPM device with the POS, scanning a barcode, or any other means of manual, direct, or wireless engagement. At step 207, the merchant (or customer) enters identifier information for the PPC into a POS terminal by any similar means of manual, direct, or wireless engagement. If the POS recognizes the customer's identification from a previous transaction, then the purchase transaction may be complete. If the customer's identification is not recognized, then at step 209 the merchant asks the customer for contact information. At step 211, the customer enters identification information in the POS, including, for example, email address or phone number. In one embodiment, the identification information does not include information typically requested when opening a financial account, such as a street address or social security number. At step 213, the identifier information for the MPM and PPC are transmitted to an authorization processor. Step 213 may also include transmission of transaction data, representing a transaction for an item the customer intends to purchase using the MPM. At step 215, the authorization processor may retransmit the PPC identifier information to the PPC issuer. At step 217, the authorization processor may store the PPC payment identifier in a database such that it is linked to the MPM. In one embodiment, the authorization processor stores a token representing the PPC payment identifier. At step 219, the authorization processor may decide whether to authorize the transaction and then may communicate that decision to the POS. At step 221, the merchant may receive notice of the approval or rejection from the authorization processor.

Figure 3:
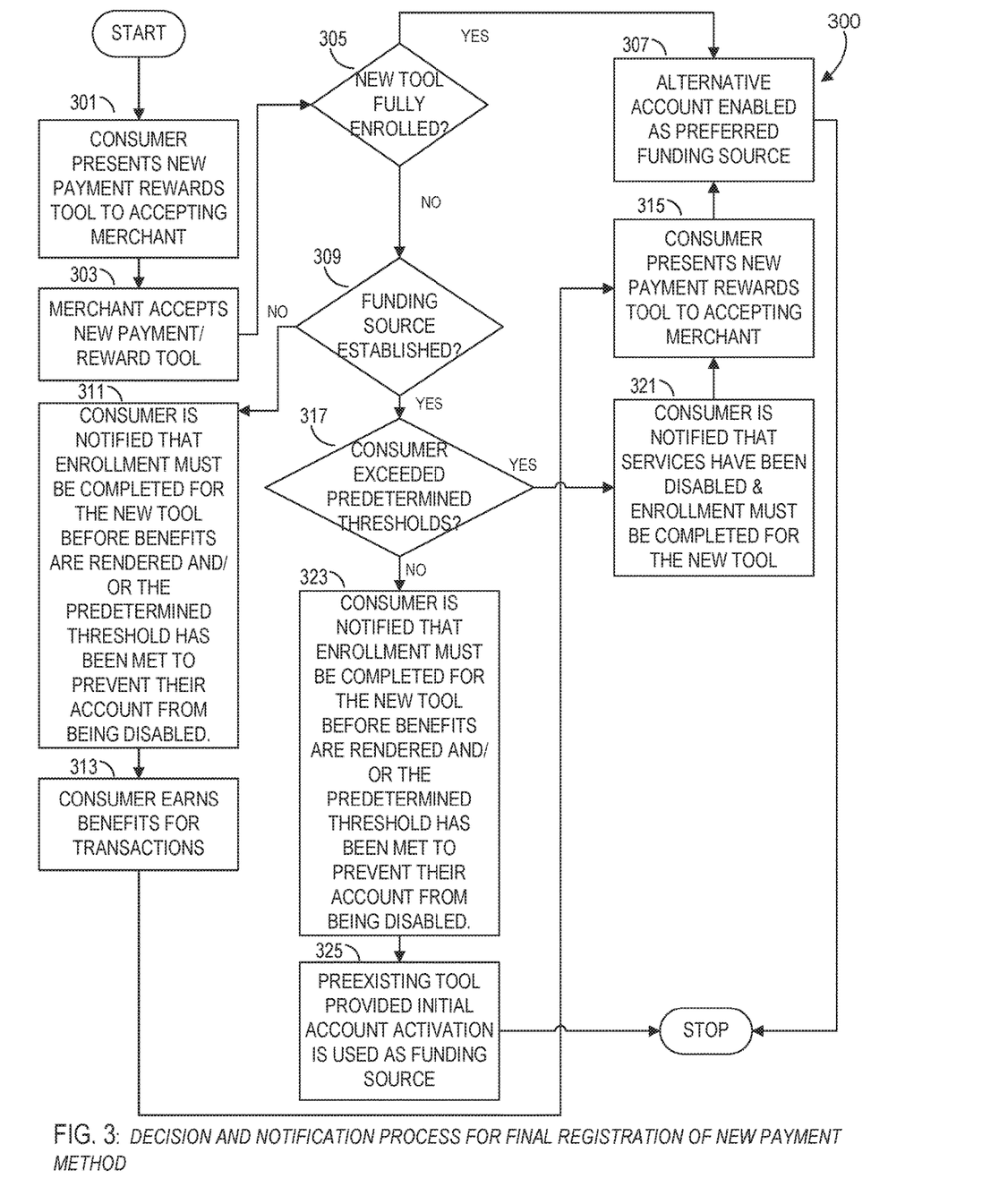
FIG. 3 shows a decision and notification process for final registration of a new payment method, according to one embodiment of the present disclosure.

FIG. 3 shows a decision and notification process 300 for final registration of a new payment method according to various embodiments. At step 301, a customer may present a new payment rewards method to a merchant, such as merchant preferred payment card. At step 303, the merchant may accept the new payment rewards method. At step 305, if the new method is fully enrolled, then, at step 307, an alternative account may be enabled as a preferred funding source. Returning to step 305, if the new method is not fully enrolled, then at step 309, the system may determine whether a funding source is established for the new payment method. If not, then at step 311, the customer may be notified that enrollment must be completed. At step 311, the customer may also be notified that the customer has met the predetermined threshold for spending on the account. At step 313, the customer may earn benefits for the transactions. At step 315, the customer may present a new payment rewards method to the merchant. The process may then continue to step 307. Returning to step 309, if a funding source is established, then at step 317, the system may determine whether the customer exceeded predetermined spending thresholds.

In one embodiment, the pre-determined threshold is a specified period of time, for example one week or one month after initially activating the new payment tool. In one embodiment, the pre-determined threshold is a number of transactions, for example two transactions or five transactions. In one embodiment, the pre-determined threshold is an amount of spend on the new payment tool, such as $100 or $500 dollars. In one embodiment, the pre-determined threshold is determined by information from the preexisting payment method, for example a maximum authorized spend amount. In various embodiments, the pre-determined threshold may be any other mechanism that limits spending on the new payment tool.

If at step 317, the consumer has exceeded predetermined thresholds, then at step 321, the customer may be notified that enrollment must be completed for the new payment method. In various embodiments, the new payment tool is disabled once the pre-determined threshold is reached. In some embodiments, the payment tool may remain enabled but the customer receives communications warning that the payment tool may be disabled if the customer does not complete registration soon. In one embodiment, the consumer may be contacted and instructed to complete the registration process and switch funding sources for the new payment tool. In various embodiments, the enrollment process employs conventional methods of linking the new payment tool to a funding source, for example an existing bank account, a prepaid account, or a revolving credit account. The new payment tool may continue to use the preexisting payment method as a secondary funding source.

The process may then continue to step 315. Returning to step 317, if the customer has not exceeded predetermined spending thresholds, then at step 323 the customer may be notified that enrollment must be completed for the new payment method to prevent the account from being disabled. At step 325, a preexisting payment method provided through initial account activation may be used as a funding source. At step 327, the customer may continue to get the benefits of the payment method without interruption.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A system, comprising:
   a database comprising:
      data corresponding to one or more new payment methods and customer preexisting payment methods;
   a computer server electronically coupled to said database programmed to:
      receive a request from a point-of-sale terminal at a merchant location to authorize a transaction, the request including data corresponding to a particular new payment method to be issued to a particular customer;

receive data corresponding to a particular customer preexisting payment method associated with the particular customer from the point-of-sale terminal;

generate and store in said database a link between said particular new payment method and said particular customer preexisting payment method, said link enabling future payment transactions with the particular new payment method to be satisfied via the particular customer preexisting payment method; and transmit a request to authorize said transaction, said request including said data corresponding to the particular customer preexisting payment method based on the link.

2. The system of claim 1, wherein said data corresponding to a particular customer preexisting payment method is converted to a token.

3. The system of claim 1, wherein said data corresponding to one or more new payment methods includes at least an identification number.

4. The system of claim 1, wherein said data corresponding to a particular customer preexisting payment method includes data from a magnetic stripe of a credit card.

5. The system of claim 1, wherein said data corresponding to a particular customer preexisting payment method includes data from a magnetic stripe of a debit card.

6. The system of claim 1, wherein said system does not perform a credit check on the particular customer.

7. The system of claim 1, wherein said computer server is further programmed to:

deny a future payment transaction with the particular new payment method upon determination that a threshold tracking value for said particular new payment method exceeds a pre-determined threshold.

8. The system of claim 7, wherein said threshold tracking value indicates a period of time since the particular new payment method was activated.

9. The system of claim 7, wherein said threshold tracking value indicates a number of transactions since the particular new payment method was activated.

10. The system of claim 7, wherein said threshold tracking value indicates a total spend since the particular new payment method was activated.

11. A system comprising:
a database comprising:
  data corresponding to one or more activated payment methods, including, for each activated payment method, at least an identification number and a threshold tracking value;
  data corresponding to one or more customer preexisting payment methods, each of said customer preexisting payment methods associated in the database with at least one of said activated payment methods;
a computer server electronically coupled to said database programmed to:
  in response to receiving at least one request to authorize a first transaction comprising data corresponding to a particular new payment method to be issued to a particular customer and data corresponding to a particular customer preexisting payment method associated with the particular customer:
    store the particular new payment method with the activated payment methods; and
    store the particular customer preexisting payment method with the customer preexisting payment methods, the particular customer preexisting payment method being associated in the database with the particular new payment method;
  receive a subsequent request from a point-of-sale terminal at a merchant location to authorize a second transaction, the subsequent request including an identification number for the particular new payment method; and
  in response to a determination that the threshold tracking value for the particular new payment method exceeds a pre-determined threshold:
    transmit to said point-of-sale terminal a message indicating denial of the subsequent request; and
    send a notification that enrollment must be completed for the particular new payment method.

12. The system of claim 11, wherein said data corresponding to the particular customer preexisting payment method is converted to a token.

13. The system of claim 11, wherein said threshold tracking value indicates a period of time since the particular new payment method was activated.

14. The system of claim 11, wherein said threshold tracking value indicates a number of transactions since the particular new payment method was activated.

15. The system of claim 11, wherein said threshold tracking value indicates a total spend since the particular new payment method was activated.

16. A point-of-sale terminal for linking a new payment method to a customer preexisting account comprising:
an alphanumeric keypad;
an electronic payment reader;
a communications system;
a computer processor, electronically connected to said alphanumeric keypad, said electronic payment reader, and said communication system, programmed to:
  receive, from said electronic payment reader, new payment method identification data for an intended product purchase;
  transmit said new payment method identification data via said communications system;
  receive, via said communications system, a message requesting initiation of an instant activation process;
  receive customer preexisting account data from said electronic payment reader;
  receive customer contact data from said alphanumeric keypad;
  transmit said customer preexisting account data and said customer contact data; and
  receive authorization for said intended product purchase in less time than it would typically take for an individual to enter personal information sufficient to open a new financial account.

17. The system of claim 16, wherein said customer preexisting account data is read from a magnetic stripe of a credit card.

18. The system of claim 16, wherein said customer preexisting account data is read from a magnetic stripe of a debit card.

19. The system of claim 16, wherein said computer processor does not receive a social security number.

20. A system comprising:
a database comprising:
  data corresponding to one or more new payment methods, including, for each new payment method, at least an identification number;

data corresponding to one or more customer preexisting payment methods;

data corresponding to one or more activated payment methods, including, for each payment method, at least an identification number, a link to data corresponding to one of said customer preexisting payment methods, customer contact data, and a threshold tracking value;

a computer server electronically coupled to said database programmed to:

receive a request from a point-of-sale terminal at a merchant location to authorize a transaction, the request including a payment method identification number;

matching said payment method identification number with an identification number corresponding to a particular new payment method in said database;

transmit a request to the point-of-sale terminal to initiate an instant activation process;

receive customer preexisting payment method data from the point-of-sale terminal;

receive particular customer contact data from the point-of-sale terminal;

store said customer preexisting payment method data in said database;

store said identification number corresponding to the particular new payment method in said database as data corresponding to an activated payment method along with a link to said customer preexisting payment method data, said particular customer contact data, and a threshold tracking value;

transmit a request to authorize said transaction, said request including said customer preexisting payment method data;

receive a response to said request to authorize said transaction indicating an approval; and transmit a message to said point-of-sale terminal indicating approval.

21. The system of claim 20, wherein said customer preexisting payment method data is converted to a token.

22. The system of claim 20, wherein said customer preexisting payment method data includes a credit card account.

23. The system of claim 20, wherein customer preexisting payment method data includes a bank account.

24. The system of claim 20, wherein said system does not perform a credit check on a customer corresponding to the particular new payment method.

25. The system of claim 20, wherein said computer server is further programmed to:

deny a future payment transaction with the particular new payment method upon determination that the threshold tracking value for said particular new payment method exceeds a pre-determined threshold.

* * * * *